June 23, 1936.                C. W. GREEN                2,045,325
                              CASH REGISTER
        Original Filed Oct. 20, 1925        6 Sheets-Sheet 3

Inventor
Charles W. Green
By Earl Beust
His Attorney

June 23, 1936.  C. W. GREEN  2,045,325
CASH REGISTER
Original Filed Oct. 20, 1925   6 Sheets-Sheet 4

Inventor
Charles W. Green
By Earl Beust
His Attorney

June 23, 1936.   C. W. GREEN   2,045,325
CASH REGISTER
Original Filed Oct. 20, 1925   6 Sheets-Sheet 5

Inventor
Charles W. Green
By
earl Beust
His Attorney

Patented June 23, 1936

2,045,325

UNITED STATES PATENT OFFICE 2,045,325

CASH REGISTER

Charles W. Green, Dayton, Ohio, assignor to The National Cash Register Company, Dayton, Ohio, a corporation of Maryland Original application October 20, 1925, Serial No. 63,695. Divided and this application January 14, 1933, Serial No. 651,775

3 Claims. (Cl. 235—6)

This is a division of the application for Letters Patent of the United States of Charles W. Green, Serial No. 63,695, filed October 20, 1925, which application issued into Patent No. 1,920,374 on August 1, 1933.

In the preferred embodiment of the invention, as disclosed in the drawings, it is applied to a machine of the key operated type, in which a key coupler is directly operated by the depression of one or more of the keys and the coupler in turn, through suitable connections, rotates a main operating shaft within the machine.

The machine herein disclosed is furthermore provided with a series of special counters, arranged in a vertical bank or tier and each adapted to register the performance of a particular function of the machine. A counter is provided to register the number of operations of the controlling lock, and this counter may be regarded as giving a fair indication of the number of resetting operations. Another counter is adapted to register the number of operations of the operating keys, while other counters are adapted to register the number of operations of certain of the special clerks' and transaction keys. Obviously, counters might be added to indicate or register the performance of any other function of which it is desired to keep a definite record.

It is an object of this invention to simplify the manufacture and assembly of the counters and their operating means, and to this end the latter are adapted to be operated by bell cranks mounted on pivots adjacent the counters themselves, the counters, as a group, thus being permitted to follow the contour of the casing of the machine and in conjunction with the operating levers forming a separable counter unit. To standardize the connections from the various special keys to their associated counters a standard actuating plate is adapted to be connected to each of these keys for movement therewith. The standard plate is provided with suitable slots to adapt it for connection with the arm of any desired counter operating lever, so that the several plates employed may be readily interchanged.

In connection with the special counters, it is an object of this invention to register the number of "No Sale" operations of the machine, without the necessity of providing a special No Sale key, as commonly used in this type of machine. This is accomplished by permitting a No Sale operation to be performed by the depression of any clerk's key without the depression of any amount or transaction key. When a clerk's key is thus operated alone a special No Sale counter will be actuated by suitable connections from the key coupler. However, when an amount or transaction key has been partially depressed and latched, in addition to a clerk's key, the connections from the key coupler to the No Sale counter are disabled. One obvious advantage of this construction is that it permits the inclusion of an extra amount key in place of the usual No Sale key provided on cash registers, for such emergencies as the making of change.

The various operating keys, in their normal positions, are maintained somewhat below the key coupler so that an initial depression of any key will not cause any movement of the coupler. It is during this initial depression of a key that it becomes latched to the key coupler without causing any movement of the latter. The obvious advantage of this construction is that it permits an easy touch for the latching of any desired keys which may be selected for operation upon a complete operation of the machine. In the normal operation of the machine, it is intended that the several keys which are to be operated for the entry of a particular item shall be latched to the key coupler successively and singly, so that the operator may control the operation of the machine by the use of but a single finger of one hand. Thus, where a series of keys are to be depressed, to represent a particular form of transaction made by a particular clerk for a given amount, involving dollars, dimes and cents, the five keys necessary to represent the transaction may be successively depressed to their latched positions, without causing any movement of the key coupler. The fact that no movement of the key coupler is required up to this time insures a substantially uniform touch in the operation of all of the keys to be latched. In the past, wherever provision has been made in a key operated machine for a successive latching of keys to the key coupler, it has been necessary to raise the coupler by the initial operation of the first key depressed, with the result that a variable amount of touch has been required in the depression of a series of keys to represent a transaction. When the desired keys have been latched to the coupler the operation of the machine may be completed by the full depression of any one of the keys already partially depressed or by the full depression of the last key to be latched to the coupler.

The latching mechanism, in the illustrative machine herein disclosed, has been mounted on a separate vertically movable frame, which is independent of the key coupler but is connected for movement at all times by the latter. By the use of this construction the keys, when partially depressed, are latched to the vertically movable frame and when the operation of the machine is continued by the full depression of one of the keys all of the latched keys are held, not only by the special latches, but also by the usual lip on the key coupler which enters a notch in the rear end of each of the depressed keys. It is toward the end of the down stroke of the keys that they are released from the special latches on the vertically movable frame, due to divergence of the paths of movement of the ends of the keys and the latches and, on the return stroke of the keys, the latches are held out of active position so that it is merely by the engagement of the lip of the coupler with the notches of the keys that the latter are held in coupled position. When the coupler reaches its normal position the lip will have been fully withdrawn from the notches in the keys so that they may be fully restored by a weighted bail. It may be understood that the special latching mechanism preferably comprises a series of separately movable members, such as bails, one of which is related to each group of keys; for example, one member may be associated with the clerks' keys, another with the transaction keys, another with the dollars amount keys, another with the dimes amount keys, etc. In connection with this form of latching mechanism, the present invention includes suitable connections for preventing a full operation of the machine until a key in one of the groups has been partially depressed. In the embodiment herein disclosed these connections cooperate with the latch member or bail associated with the clerks' group of keys so that a full operation of the machine is prevented until one of the clerk's keys has been partially depressed. This mechanism is so constructed, however, that no particular sequence of operation of the keys is compelled and it is immaterial whether the clerk's key is depressed prior to or after the depression of either the transaction or amount keys.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Frame work

Suitable frame work is provided for the purpose of supporting the various operating elements of the machine. This supporting structure comprises a pair of side frames 1 and 2 (Fig. 1) which are connected toward the rear of the machine by a cross frame 3 (Fig. 2), and toward the front of the machine by a tie bar 4, and at various intermediate points by the several shafts, which will be mentioned. A base plate 5 (Fig. 2) serves to connect the side plates and support them.

Main operating parts

Figure 10:
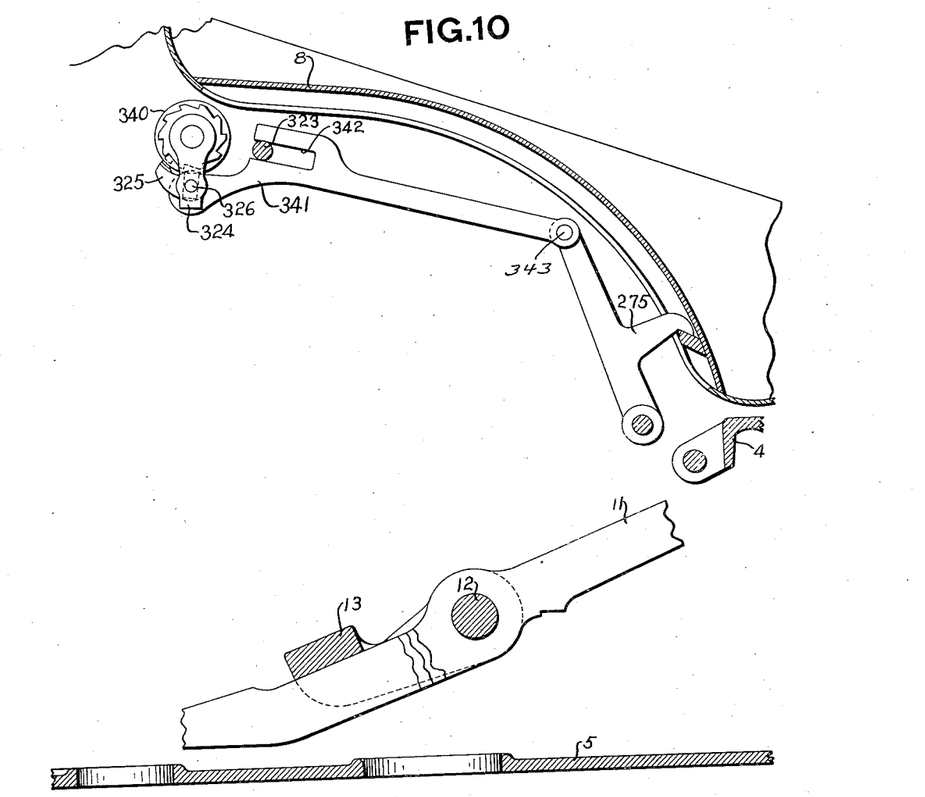
Fig. 10 is a sectional elevation of the machine and is a view toward the right, showing portions of the connections from the control lock to the various sections of the machine affected by the turning of the lock. The "Resetting" special counter and its operating mechanism is also shown.

The illustrative machine is of the key operated type of cash register and is provided with the usual series of operating keys, including amount keys 11 (Figs. 1 and 10) and a number of special keys 51 and 52.

Figure 1:
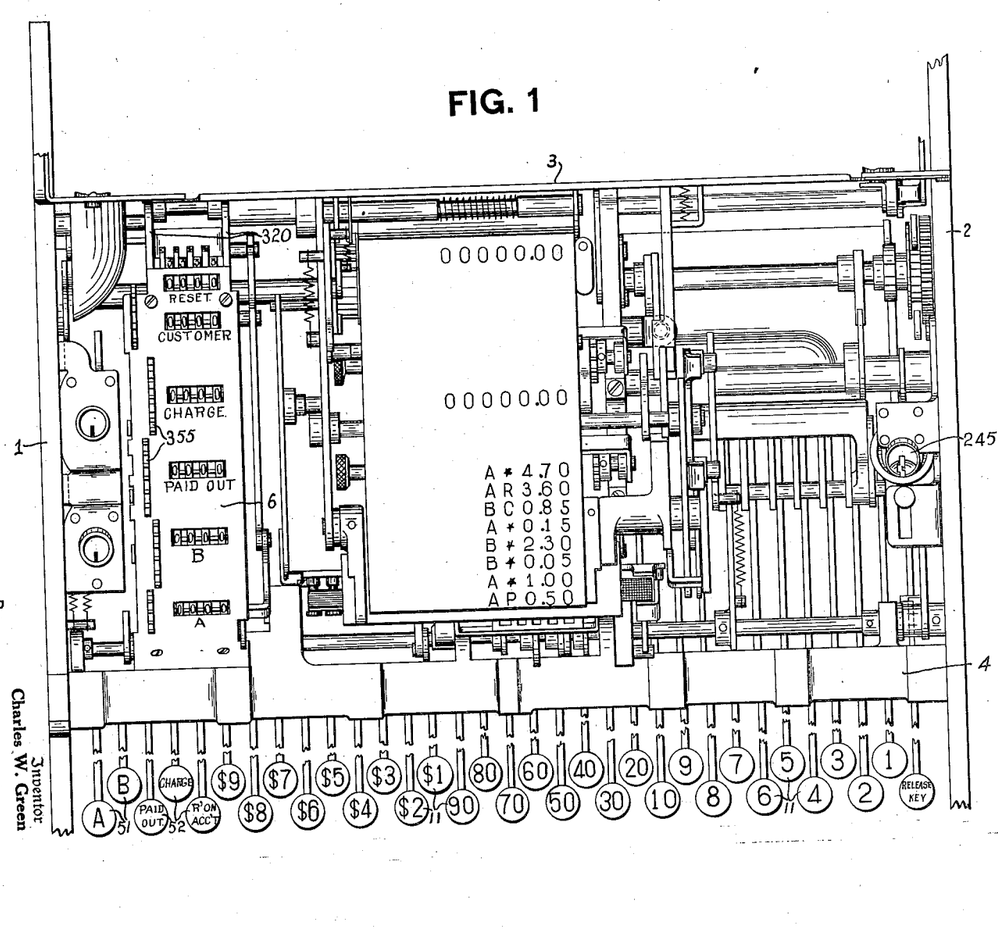
Fig. 1 is a plan view of the machine with the casing removed, a portion of the keys and side frames being broken away.
Figure 2:
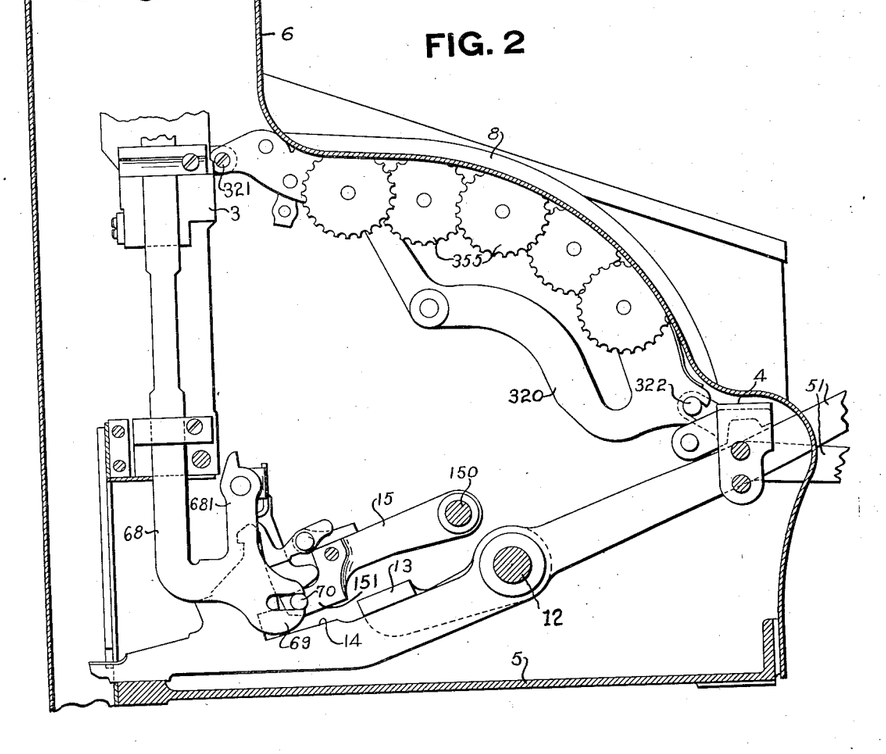
Fig. 2 is a sectional elevation of the machine, taken just inside the left-hand side frame and disclosing, particularly, the clerks' keys and their controlling locks, as well as the general control lever.
Figures 3, 4, 5, 6, 7:
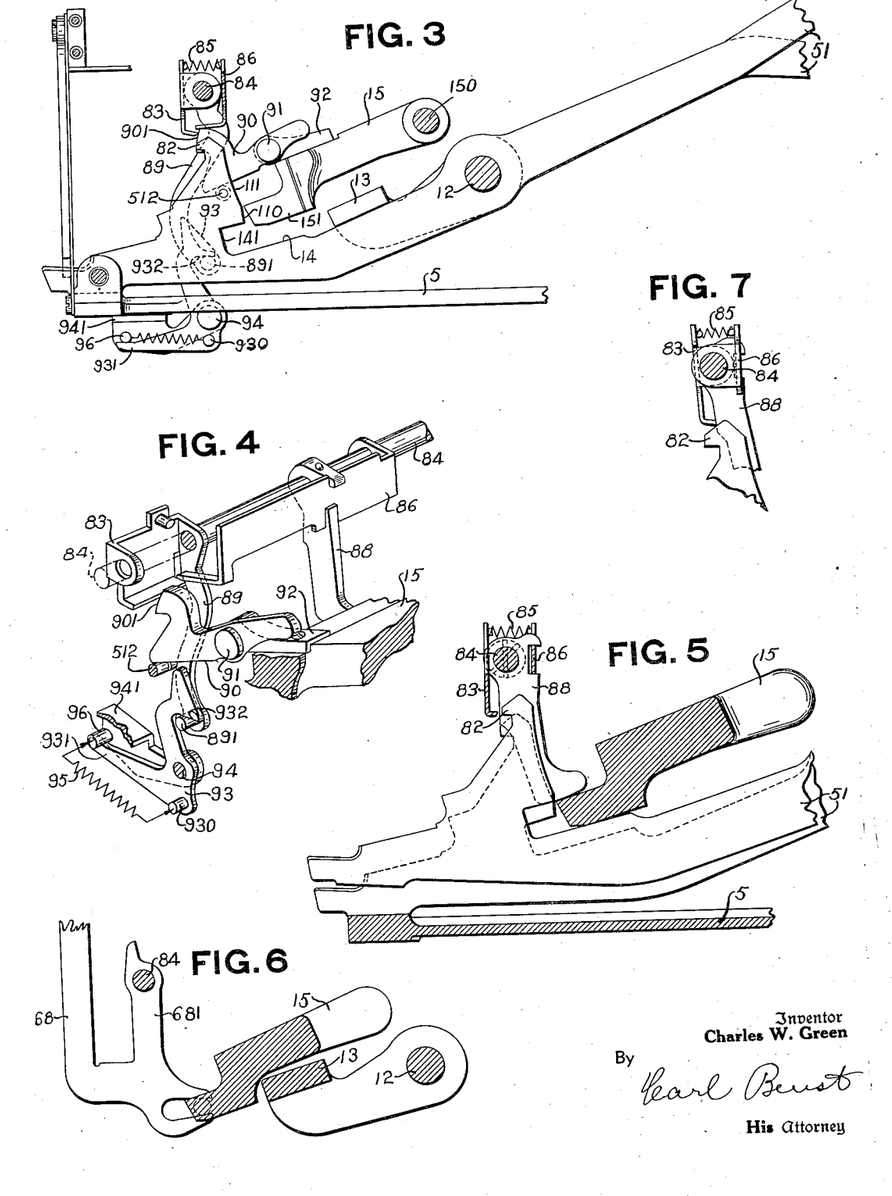
Figs. 3, 4, 5, 6 and 7 are detailed views of certain portions of the key latching and releasing mechanism.
Figure 8:
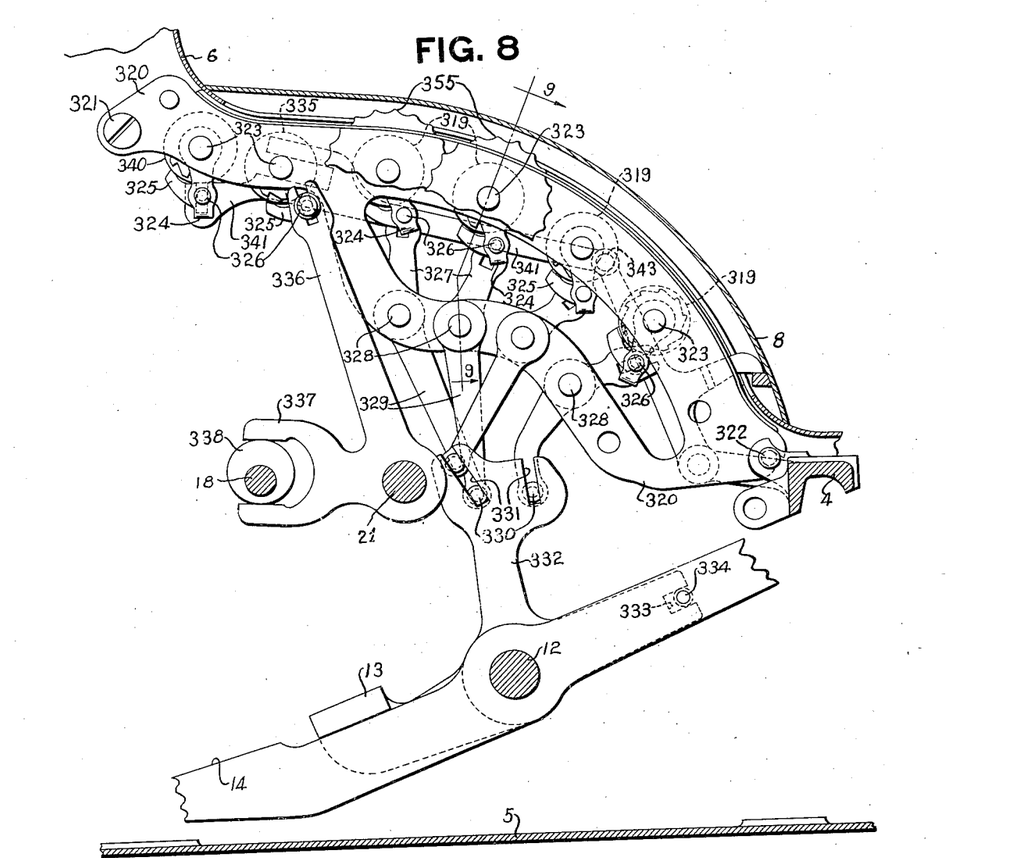
Fig. 8 is a sectional elevation, taken to the left of the tier of special counters, and showing particularly the mounting and operating connections for these counters.
Figure 9:
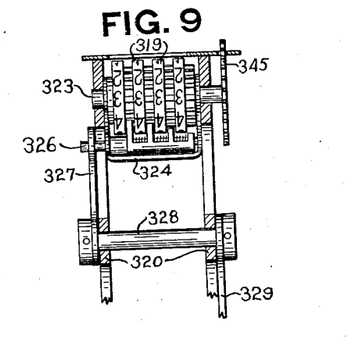
Fig. 9 is a detail, in sectional front elevation, taken on line 9—9 of Fig. 8 of one of the special counters and its operating connections.

The machine, as disclosed, is provided with 27 amount keys (Fig. 1) for registering amounts from 1¢ to $9.99, but obviously the capacity of the machine and the designation of the amounts may be varied to suit the particular use to which the invention is put. The operating keys, as shown in Figs. 2, 3 and 8, are all mounted on a shaft 12 extending across the machine between the side frames 1 and 2, and the keys are normally maintained with their forward operating ends elevated by means of a weighted bail 13 extending across the tops of all the keys in rear of their pivots, the bail having a plurality of arms extending forwardly and pivoted about the key shaft 12. Depression of the forward end of any key will serve to elevate the weighted bail 13 and carry the upper surface of the latter substantially into engagement with the under cutout surface of a key coupler 15. At the same time, an upper surface 14 toward the rear end of the key will engage the under surface of a projecting lip 151 of the key coupler. Continued depression of the forward end of the key will then serve to elevate the key coupler 15 as well as the bail 13, and during this continued movement of the parts the lip 151 of the coupler will enter the notch 141 of the operated key.

Keys and latching mechanism

In order that the several keys may be partially depressed, as explained, and then carried by the key coupler for a full operation, and also to prevent the depression of additional keys after the coupler has been shifted, it has been found desirable to provide the rear ends of each of the key levers with a compound surface adapted to cooperate with the lip of the key coupler, the surface being composed of two arcs generated about two distinct centers. Taking the clerks' keys, for example, as shown in Fig. 3, a surface 110, which is in an arc about the key shaft 12 as a center, is provided to permit the first partial depression of selected keys, whereas the longer surface 111 which constitutes an arc about the center or pivotal point 150 of the key coupler, is such that as the coupler swings during an operation of the machine, it will not interfere with undepressed keys but will serve to prevent the depression of any additional keys after the coupler has commenced its movement.

It will be apparent that if a key were partially depressed and released it would be immediately restored to normal by the bail 13, if suitable means were not provided for holding it in partially depressed position. The latching means, for preventing this return (Figs. 3 to 7) comprises a hooked extension 82 toward the rear end of each of the keys, which is adapted to cooperate with one of a series of bail members 83 pivoted about a shaft 84 mounted in upwardly extending arms 681 (Figs. 2 and 6) of upright members 68 associated with indicator flash mechanism not shown in the present case. The number of bails 83 which are required depends upon the number of groups of keys, there being one bail for each group of amount keys, such as the dollars, dimes and cents groups, one bail for the clerks' keys and one bail for the special transaction keys. All of the bails 83 are normally urged in a counter-clockwise direction (Figs. 3, 5 and 7), by means of springs 85 extending between projections on the bails and projections on a pair of separate retaining bails 86 secured to the shaft 84.

Whenever an amount key is depressed sufficiently to carry the rear upper surface 14 (Fig. 3) into engagement with the lower surface of the key coupler lip 151, the hook 82 (Fig. 7) will first rock the bail 83, associated therewith, rearwardly until the shoulder of the hook is carried above the lower flange of the associated bail 83, at which time the bail is returned by the spring 85 to engage its flange under the hook, so that return of the key to its normal position will be prevented. Operation of a special transaction key will result in substantially the same latching action.

In order that depression of a clerk's key may be enforced, prior to any movement of the key coupler, the bail associated with the clerks' keys is of a slightly different form and differs slightly in its action. Attached to one end of the clerk's key bail 83 is a downwardly extending arm 89 (Fig. 4) carrying a pin 891, which is adapted to cooperate with a hook member 93 which is pivoted at 94 to a frame plate 941 secured to the under side of the base plate 5 (Figs. 3 and 4). A spring 95, attached to the hook member by a pin 930 and to the frame plate 941 by a pin 96, tends to rock the hook member until a rearwardly extending tail 931 engages the pin 96. When the machine is at rest a pivoted detent pawl 90, which is carried by the key coupler through a pivot pin 91 mounted on a plate 92, secured to the coupler, serves to hold the clerks' key latching bail rearwardly by the engagement of the surface 901 of the detent pawl with the lower overturned flange of the bail. When the bail is so held in rearward position the pin 891, carried by its arm 89, engages under the shoulder 932 of the hook member 93. A plurality of arms 88 secured by some suitable means, such as pins, to the shaft 84, are located between the several amount and transaction key bails and each has an over-turned foot (Fig. 5) which engages over the lip of the key coupler, so that as the latter is rocked, during an operation of the machine, its movement will be transmitted to the shaft 84. It will also be recalled that this shaft is carried by an extension of each of the uprights 68 (Fig. 2), which are raised by the key coupler through the cooperation of the forked ends 69 with the pins 70. It will be apparent, therefore, that when the hook member 93 is engaged over the pin 891 upward movement of the shaft 84 is prevented and the key coupler is locked against operation.

Each clerk's key is provided with a laterally extending pin 512 (Figs. 3 and 4) which has its end in the plane of the detent pawl 90 to the rear of the pivot 91 of the latter, so that as any clerk's key is depressed to engage its upper surface with the under side of the key coupler lip, the detent pawl will be rocked to carry its surface 901 above the lower overturned flange of the clerk's bail 83. This rocking of the detent pawl will permit the spring 85 to rock the clerk's key bail to engage the shoulder of the hook 82 of the depressed clerk's key and, at the same time, to carry the pin 891 from under the shoulder 932 of the hook member 93, with the result that the shaft 84, as well as the key coupler, is unlocked for operation.

*Special counters*

In accordance with the present invention, the machine herein disclosed is provided with a series of special counters, each adapted to register consecutive numbers and all arranged in a vertical tier within the machine, directly beneath the special lid 8 (Fig. 8). The series of special counters and the major portion of their operating connections are supported by a pair of spaced plates 320 (Figs. 1, 2 and 8) which are removably secured in the machine, directly below the lid 8. At their forward ends these plates are provided with forked extensions which are adapted to cooperate with a rod 322, supported by a pair of rearwardly and upwardly extending ears projecting from the tie bar 4 (Figs. 2 and 8). The rear upper ends of the plates 320 are supported by means of screws 321 which are adapted to attach the plates to a pair of forwardly extending lugs formed on the rear frame member 3. By merely removing the pair of screws 321 the supporting plates 320 and all of the special counter mechanism directly supported thereby may be readily removed from the machine, whenever the lid 8 is open. Supported at opposite ends by the plates 320 are a series of shafts 323 on which are mounted the counting wheels and driving ratchets of the various special counters. All of the counters are of the well known deep notch transfer type, in which the wheels are adapted to be driven by means of a multi-tined pawl 325 (Fig. 8) mounted on a rod 326 extending between the sides of a bail member 324. Rocking of the bail, by means which will be described, will serve to cause the prongs of the actuating pawl 325 to engage ratchet wheels adjacent each of the number wheels of the counter, and upon each operation of the bail will serve to add a unit in the counter.

Figure 13:
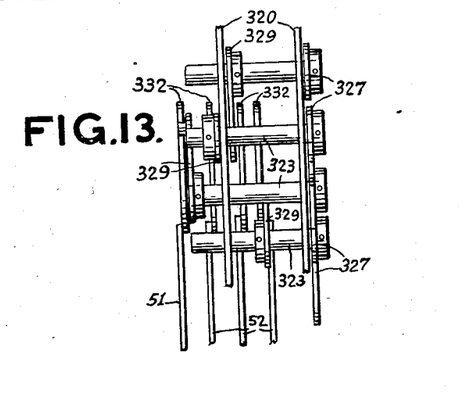
Fig. 13 is a plan view of parts of the operating mechanism for the special counters.

The illustrative machine is provided with four consecutive number counters 319 which are connected for direct operation by certain of the special clerks' and transaction keys. Connections from each of the bails 324, associated with these four counters, comprise a series of actuating arms 327 (Fig. 8) mounted at one end upon a series of rods 328, which are supported at opposite ends by the pair of plates 320. At their upper ends the arms 327 are provided with suitable slots to engage an extension of the pin 326, which supports the multi-tined pawl. Secured to each of the rods 328, at some suitable point, is an arm 329 which extends downwardly and carries at its lower end a pin 330 which is adapted to cooperate with a slot 331 in an operating plate 332 mounted upon the key shaft 12. A forward extension of the operating plate is provided with a notch 333 which cooperates with a pin 334 on the associated special clerk's or transaction key 51 or 52. The four counters, which have been mentioned, are connected by the means described to the three transaction keys designated, "Charge", "Paid out" and "Received on account" and to the "B" clerk's key. In order to permit the use of uniform operating plates 332, each is provided with a pair of slots 331, and the arms 329 are so formed and directed that the pins 330, carried thereby, may cooperate with one or the other of the slots 331. As shown in Fig. 13, the arms 329 are suitably located on their rods 328 so as to place the pins 330 in the proper planes of the operating plates 332. Through the connections described, it will be seen that the operation of any one of the four special keys, "Charge", "Paid out", "Received on account" and "B", will serve to add a unit in the related special counter.

Another consecutive counter 335 is provided, for the purpose of counting the total number of operations of the machine. For this purpose, the pin 326, which supports the actuating pawl 325 of this counter, is engaged by the slot in the upper end of a bell crank lever 336, which is pivoted about the shaft 21. The rear arm 337 of this bell crank is forked to engage the opposite sides of a cam disk 338 mounted on the main rotation shaft 18. Accordingly, upon each rotation of the shaft 18, the bell crank 336 will be rocked and a unit will be inserted into the counter 335, which is designated as the "Customers' counter".

Another counter, 340, (Figs. 8 and 10) is provided, for the purpose of registering the number of operations of the control lock 245 (Fig. 1), so that the amount indicated upon this counter may be fairly taken as an indication of the number of times that a resetting operation has been performed. Connections for operating the "Resetting" counter 340 include a slide member 341 having a vertical slot at its rear end, which is adapted to engage the pin 326, mounted in the bail 324 and supporting the operating pawl 325, associated with this counter. A substantially horizontal slot 342, formed in the member 341, is adapted to cooperate with the shaft 323 of the "Customer" counter, for the purpose of supporting and guiding the slide member. At its forward end the slide 341 is pivoted at 343 to the upper end of the hook member 275 which is for the purpose of locking the special lid 8 and is adapted to be rocked by the turning of the barrel of lock 245 (Fig. 1). Thus, as the hook is rocked rearwardly to release the special lid 8, a unit will be added in the special "reset" counter 340.

Figures 11, 12:
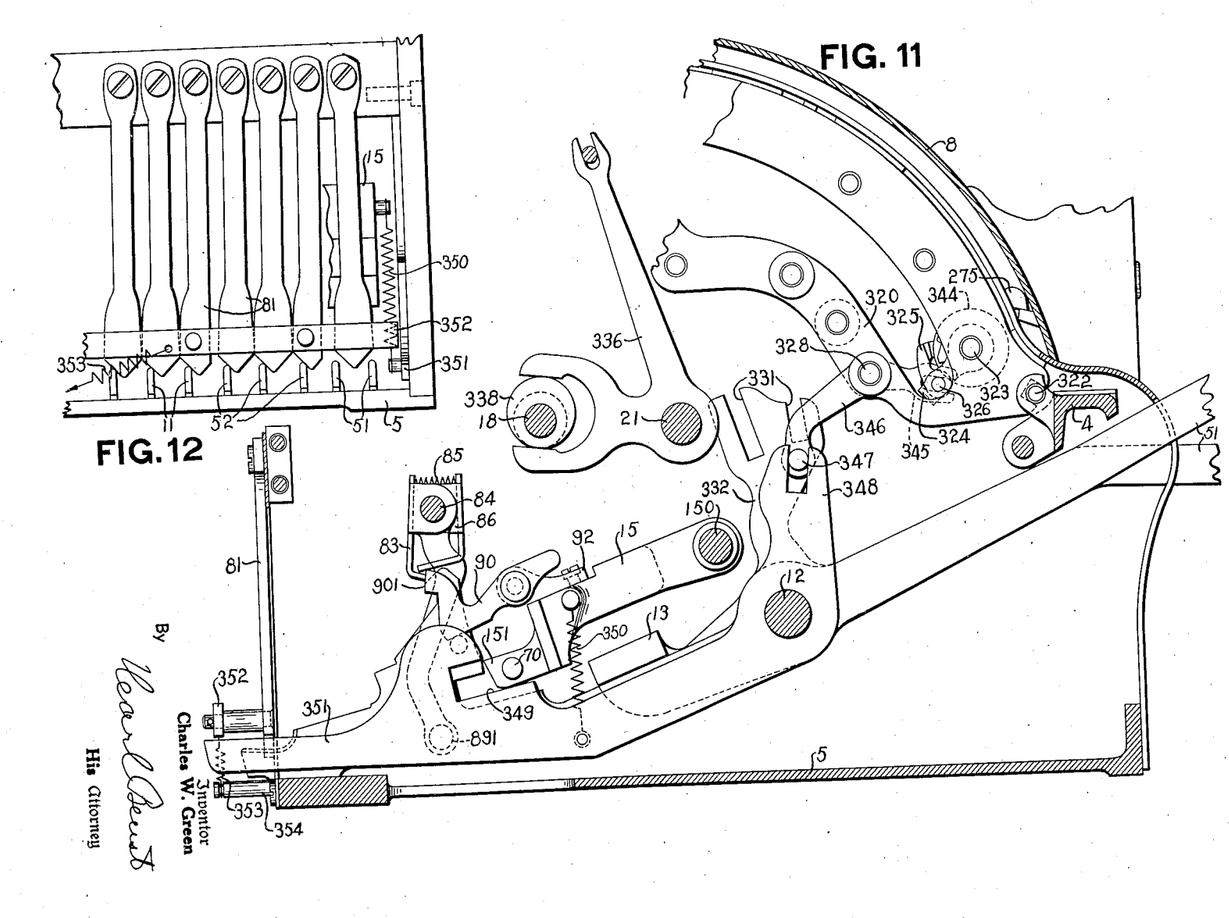
Fig. 11 is a sectional elevation taken to the left of the special counter section showing particularly the No-sale counter operating means and the control lever for disabling the clerks' and amount keys interlock.
Fig. 12 is a detail view of a portion of the single-key pendants showing the bar controlling the operation of the No-sale counter.

Finally, a counter 344 is provided for registering the number of "No sale" operations of the machine. Since no "No sale" key has been provided, in this machine, suitable connections are employed for operating the "No sale" counter whenever a clerk's key is operated, without the depression of either an amount or a transaction key. As best shown in Fig. 11, the counter 344 is provided with the usual operating bail 324 and multi-tined pawl 325. A pair of levers 345 and 346, mounted upon a rod 328, constitutes the connection from the operating mechanism to the counter operating devices. A pin 347, mounted in the arm 346, is adapted to cooperate with a slot in the upper end of an operating rock plate 348. At the rear of this rock plate a notch 349 is provided to cooperate with the lip of the key coupler during "No sale" operations, and a spring 350 is provided for connecting the rock plate with the key coupler and tending to cause their joint movement during the initial movement of the coupler. Whenever an amount or transaction key is operated, however, a bar 352, connected to the single key pendants 81, associated with these keys (Fig. 12) is carried to the right, so that its end lies over the tail 351 of the operating rock plate. When the bar is so shifted the spring 350 will be tensioned upon movement of the coupler but will not be able to carry the rock plate along with the key coupler, and the notch 349 will not be engaged with the lip of the coupler. A spring 353, extending between the bar 352 and a pin 354 (Fig. 11) projecting from the base plate serves to maintain the bar in its normal position, shown in Fig. 12. It will be apparent that, upon each operation of the key coupler, in which the bar 352 is not shifted, a unit will be added in the "No sale" counter 344.

In order that the various special counters may be restored to their zero positions, whenever desired, at the end of some particular accounting period, a finger wheel 355 (Figs. 1, 2 and 8) is secured to each of the shafts 323 and these wheels extend a slight distance above the surface of the casing 6, but are concealed by the lid 8. By the well known pawl and notch connection between the shafts 323 and the several special counter wheels mounted thereon, rotation of the shafts through the finger wheels 355 will serve to turn the counter wheels forwardly to their zero positions.

*Summary of operation*

Suppose that a cash transaction is now to be entered by clerk "B" in the amount of $5.51, the amount keys may first be depressed, successively, to their latched or coupling positions. For example, the $5 key may first be operated to rock the weighted bail 13 until its upper edge is substantially in engagement with the under side of the key coupler, at which time the surface 14 of this key will have been brought into engagement with the lower edge of the lip of the coupler. This partial depression of the $5 key will have brought its hook 82 (Fig. 7) above the overturned flange of the bail 83, associated with the dollars keys. Movement of the key coupler is, at this time prevented by the cooperation between the hook member 93 and the stud 891 carried by the arm 89, which is connected with the clerk's key bail, which in turn is mounted on the shaft 84 connected to the key coupler through the uprights 68 and arms 88 and, accordingly, further movement of the $5 key is also prevented. The 50¢ key and the 1¢ key may then be depressed in succession to carry their hooks 82 over the flanges of their associated bails 83. Depression of all of the amount keys, specified, will have served to rock the associated cam plates 19 to a slight extent but, due to the formation of the cam slots in these plates, no movement will have been transmitted to the segment frame. Up to this time the key coupler will have remained locked, as explained, by the engagement of the hook 93 over the pin 891 carried by the clerk's key bail. Now, in order to release the machine for full operation, the "B" clerk's key 51 is depressed and is given a full operation to cause a complete entry of the transaction in the machine.

During the initial movement of this clerk's key a pin 512, extending laterally from it, will cooperate with a pivoted dog 90 (Fig. 4) and rock it sufficiently to carry the surface 901 above the flange of the clerk's key bail 83 and, at the same time the hook 82, at the rear of the clerk's key, will have been carried above this flange. The spring 85 which is compressed between a lug on the restoring bail 86 and a lug on the clerk's latching bail 83, will now serve to swing the latter, not only to retain the clerk's key in its depressed position, but to carry the pin 891 from under the locking surface 932 of the hook 93, with the result that the key coupler is no longer locked against operation and a full depression of the clerk's key will be transmitted to carry all of the latched keys through a completed cycle of operation.

Another function which is performed during an operation of the machine, such as now being described, is the insertion of a unit in a plurality of special consecutive counters. Thus, upon every operation of the machine, the customer counter 335 is operated by means of a cam 338, mounted on the main shaft 18, cooperating with a double lever 336, 337, whose upper end is slotted to engage a pin extending from the operating bail for this counter. Upon each rotation of the main shaft a unit is added to the customer counter, through the connections mentioned. One of the counters 319, furthermore, is operated during the entry of the assumed transaction and this is the counter which is associated with the "B" clerk's key. The connections for inserting a unit into this counter, as best shown in Fig. 8, includes a multiple tined pawl 325, mounted in a bail 324, which is adapted to be rocked by a lever 327, secured to a cross rod 328 which, in turn, is rocked by means of an arm 329, which cooperates with a slot in a plate 332 connected with the B clerk's key 51. If one of the special transaction keys 52 had been depressed, during the operation of the machine, similar connections would have effected the entry of a unit in a related special counter 319.

When the parts have been restored to their normal positions by the action of the key coupler and the weighted bail 13, a new transaction may be entered by the depression of any desired clerk's, transaction, and amount keys. It is not essential that the amount keys shall be depressed prior to the clerk's key, although this is the preferable mode of operation. In fact, the machine may be fully operated by the mere depression of a clerk's key, if desired, and if so operated it produces, in effect, a "No sale" operation. At the same time, a unit will be added into a special "No sale" counter and, for this purpose the construction is such as to normally connect this counter for operation by the key coupler, upon each operation of the machine, by the engagement of the opening 349 of the spring tensioned rock plate 348 over the lip of the coupler. Whenever an amount or transaction key is depressed, however, a bar 352 is shifted into cooperation with the rear extension 351 of the rock plate to prevent the spring 350 from engaging the opening 349 with the lip of the coupler and thereby prevent the insertion of a unit into the "No sale" counter.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed, is:

1. In a machine of the class described, a plurality of amount keys, a clerk's key, means common to said amount keys and clerk's key and operated thereby, a special counter, a connection from said common operated means to the counter for operating said counter when merely a clerk's key is operated, and a blocking means between said amount keys and the counter operating connection for disabling said counter operating connection when an amount key is operated.

2. In a machine of the class described, a plurality of amounts keys, a clerk's key, a key coupler common to the amount keys and clerk's key and operated thereby, a no-sale counter, a connection from the key coupler to the counter for operating the same when a clerk's key is operated, and a blocking means between the amount keys and the first named connection for disabling said first connection when an amount key is operated in conjunction with a clerk's key.

3. In a machine of the class described, a plurality of amount keys, a clerk's key, a key coupler common to the amount keys and clerk's key and operated thereby, a no-sale counter, a connection from the counter to the key coupler including means to connect the counter to the coupler for positive movement by the coupler when raised, and a blocking means between the amount keys and the first named connection for preventing the said connection for positive movement, when an amount key is operated in conjunction with a clerk's key.

CHARLES W. GREEN.